(12) United States Patent
Liang et al.

(10) Patent No.: US 7,953,819 B2
(45) Date of Patent: May 31, 2011

(54) MULTI-PROTOCOL SHARABLE VIRTUAL STORAGE OBJECTS

(75) Inventors: Rui Liang, Natick, MA (US); Jiannan Zheng, Ashland, MA (US); Mark K Ku, Braintree, MA (US); Xiaoye Jiang, Shrewsbury, MA (US); Sorin Faibish, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 2567 days.

(21) Appl. No.: 10/646,851

(22) Filed: Aug. 22, 2003

(65) Prior Publication Data

US 2005/0044162 A1    Feb. 24, 2005

(51) Int. Cl.
G06F 15/16    (2006.01)
G06F 7/00    (2006.01)
G06F 17/00    (2006.01)

(52) U.S. Cl. ......... 709/219; 709/230; 709/233; 707/610

(58) Field of Classification Search ................. 707/204; 709/202, 212
See application file for complete search history.

(56) References Cited

U.S. PATENT DOCUMENTS

| | | | | |
|---|---|---|---|---|
| 5,742,792 | A | 4/1998 | Yanai et al. .................... 395/489 |
| 5,819,292 | A * | 10/1998 | Hitz et al. ...................... 707/203 |
| 5,948,062 | A | 9/1999 | Tzelnic et al. ................. 709/219 |
| 5,974,503 | A | 10/1999 | Venkatesh et al. ............. 711/114 |
| 5,974,563 | A | 10/1999 | Beeler, Jr. ......................... 714/5 |
| 6,076,148 | A | 6/2000 | Kedem ........................... 711/162 |
| 6,353,878 | B1 | 3/2002 | Dunham ........................ 711/162 |
| 6,397,292 | B1 | 5/2002 | Venkatesh et al. ............ 711/114 |
| 6,564,229 | B1 * | 5/2003 | Baweja et al. ................ 707/200 |
| 6,934,804 | B2 * | 8/2005 | Hashemi ........................ 711/114 |
| 7,010,553 | B2 * | 3/2006 | Chen et al. ..................... 707/203 |
| 7,076,509 | B1 * | 7/2006 | Chen et al. ..................... 707/202 |
| 7,107,385 | B2 | 9/2006 | Rajan et al. ........................ 711/4 |
| 2001/0052021 | A1 * | 12/2001 | Bolosky et al. ................ 709/233 |
| 2002/0010665 | A1 * | 1/2002 | Lefebvre et al. ................. 705/31 |
| 2002/0095616 | A1 * | 7/2002 | Busser ............................... 714/8 |
| 2002/0199000 | A1 * | 12/2002 | Banerjee ........................ 709/230 |
| 2003/0217119 | A1 | 11/2003 | Raman et al. ................. 709/219 |
| 2004/0030668 | A1 * | 2/2004 | Pawlowski et al. ............... 707/1 |
| 2004/0030727 | A1 | 2/2004 | Armangau et al. ........... 707/200 |

(Continued)

OTHER PUBLICATIONS

VERITAS, "VERITAS Backup Exec for Windows Servers(tm) Administrator's Guide", Oct. 2002, pp. 39-40, 955-957.*

(Continued)

Primary Examiner — Wen-Tai Lin
(74) Attorney, Agent, or Firm — Richard Auchterlonie; Novak Druce & Quigg, LLP

(57) ABSTRACT

A storage object such as a virtual disk drive or a raw logical volume is contained in a UNIX compatible file so that the file containing the storage object can be exported using the NFS or CIFS protocol and shared among UNIX and MS Windows clients or servers. The storage object can be replicated and backed up using conventional file replication and backup facilities without disruption of client access to the storage object. For client access to data of the storage object, a software driver accesses the file containing the storage object. For example, a software driver called a virtual SCSI termination is used to access a file containing a virtual SCSI disk drive. Standard storage services use the SCSI over IP protocol to access the virtual SCSI termination. An IP replication or snapshot copy facility may access the file containing the virtual SCSI disk drive using a higher-level protocol.

10 Claims, 14 Drawing Sheets

U.S. PATENT DOCUMENTS

| | | | | |
|---|---|---|---|---|
| 2004/0030846 | A1 | 2/2004 | Armangau et al. | 711/154 |
| 2004/0030951 | A1 | 2/2004 | Armangau et al. | 714/6 |
| 2004/0059822 | A1 | 3/2004 | Jiang et al. | 709/230 |
| 2005/0015663 | A1 | 1/2005 | Armangau et al. | 714/15 |
| 2006/0101025 | A1* | 5/2006 | Tichy et al. | 707/100 |

OTHER PUBLICATIONS

PCMAG.COM. "Definition of Unix Socket". Retrieved from "http://www.pcmag.com/encyclopedia_term/0,2542,t=Unix+socket&i=53469,00.asp" on Jul. 30, 2008.*

Iana. "Port Numbers" Retrieved from "http://www.iana.org/assignments/port-numbers" on Jul. 30, 2008. Last updated on Jul. 28, 2008.*

Sean Derrington, "NAS and SAM Storage: Separate but Equal?—Part 2," File 838, Server Infrastructure Strategies, Meta Group Inc., 208 Harbor Drive, Stamford, CT 06912-0061, Jun. 12, 2000, 4 pages.

Charles M. Kozierok, "Overview of SCSI-3 Standards," The PC Guide, http://www.pcguide.com/ref/hdd/if/scsi/std/scsi3Over-c.html, Apr. 17, 2001, 3 pages.

EMC Celerra SE5 File Server, EMC Corporation, Hopkinton, Mass. 01748-9103, 2002, 2 pages.

David A. Patterson, Garth Gibson, and Randy H. Katz, "A Case for Redundant Arrays of Inexpensive Disks (RAID)," Report No. UCB/CSD 87/391, Dec. 1987, Computer Science Division, University of California, Berkeley, California 94720 (24 pages).

EMC Celerra HighRoad, EMC Corporation, Hopkinton, Mass., 2002, 10 pages.

David Sacks, "Demystifying Storage Networking: DAS, SAN, NAS, NAS Gateways; Fibre Channel, and iSCSI,"IBM Corporation, Jan Jose, California, 2001, 31 pages.

"iSCSI Technical White Paper," Nishan Systems, San Jose, California, 2001, 12 pages.

"iSCSI and SEP," Computer Science Department, University of Massachusetts, Lowell, Mass., 2002, 52 pages.

"IP Packet Structure," Connected: An Internet Encyclopedia, Freesoft.org, printed Jul. 7, 2003, 10 pages.

Gorry Fairhurst, "IP Packet Header," published at www.erg.abdn.ac.uk, printed Jul. 7, 2003, 2 pages.

"Graphical Management of Celerra Network Server for the Microsoft Administrator," White Paper, EMC Corporation, Hopkinton, Mass., May 18, 2003, 20 pages.

"Celerra File Server in the E-Infostructure," EMC Corporation, Hopkinton, Mass., 2000, 9 pages.

"Celerra File Server Architecture for High Availability," EMC Corporation, Hopkinton, Mass., Aug. 1999, 7 pages.

"Symmetrix Data Migration Services," EMC Corporation, Hopkinton, Mass., 2000, 4 pages.

John Phillips, "Storage Consolidation and Data Protection Using MultiStore™," Network Appliance, Inc., Sunnyvale, CA, 2003, printed Oct. 16, 2003, 13 pages.

Andy Watson and Paul Benn, "Multiprotocol Data Access: NFS, CIFS and HTTP," Network Appliance, Inc., Sunnyvale, CA, 2003, printed Dec. 12, 2003, 29 pages.

"Virtual Machines as Special class of Operating Systems," published at www.softpanorama.org, printed Jul. 24, 2002, 13 pages.

"Active Directory Overview," Microsoft Corporation, 1999, 13 pages.

"Sun Microsystems Gives Key Component of Network File System (NFS) to the Open Source Community," Sun Microsystems, Inc., Santa Clara, CA, Feb. 2, 2000, 2 pages.

"NFS: Network File System Protocol Specification," Network Working Group, Request for Comments: 1094, Sun Microsystems, Inc., Santa Clara, CA, Mar. 1989, 27 pages.

S. Shepler et al., "Network File System (NFS) Version 4 Protocol," Network Working Group, Request for Comments: 3530, The Internet Society, Reston, VA, Apr. 2003, 262 pages.

"Data General, Digital, Intel, Intergraph, Network Appliance and Others Join Microsoft in Support of Common Internet File System," Microsoft Corp., San Jose, Calif., Jun. 13, 1996, 2 pages.

Paul J. Leach and Dilip C. Naik, "A Coimnon Internet File System (CIFS/1.0) Protocol," Network Working Group, Internet Engineering Task Force, The Internet Society, Reston, VA, Dec. 19, 1997, 121 pages.

J. Satran et al., "Internet Small Computer Systems Interface (iSCSI)," Network Working Group, Request for Comments: 3720, The Internet Society, Reston, VA, Apr. 2004, 240 pages.

* cited by examiner

DRIVER OPCODES

| | |
|---|---|
| READ | READS A SPECIFIED LENGTH OF DATA FROM A SPECIFIED STORAGE OBJECT BEGINNING AT A SPECIFIED OFFSET |
| WRITE | WRITES A SPECIFIED LENGTH OF DATA TO SPECIFIED STORAGE OBJECT BEGINNING AT A SPECIFIED OFFSET |
| INFO | GETS A LIST OF THE STORAGE OBJECTS ON THE SERVER, OR GETS THE CAPACITY AND HANDLE OF A NAMED OBJECT |
| NO-OP | SENDS A PACKET TO A SERVER TO GET A RETURN PACKET TO TEST OR KEEP ALIVE THE TCP CONNECTION |
| PAUSE | PAUSE ACCESS TO A SPECIFIED STORAGE OBJECT |
| RESUME | RESUME ACCESS TO A SPECIFIED STORAGE OBJECT |
| SNAP | SNAPSHOT MANAGEMENT WITH RESPECT TO A SPECIFIED STORAGE OBJECT |
| READ OPAQUE | OPAQUE READ WITH RESPECT TO A SPECIFIED STORAGE OBJECT |
| WRITE OPAQUE | OPAQUE WRITE WITH RESPECT TO A SPECIFIED STORAGE OBJECT |
| AUTH | AUTHENTICATE THE DRIVER IDENTITY TO THE SERVER |
| MSG | SEND A MESSAGE TO THE SERVER |

FIG. 10

SERVER OPCODES

| | |
|---|---|
| READ | RETURNS THE REQUESTED DATA |
| WRITE | RETURNS A CONFIRMATION OF THE WRITE OPERATION |
| INFO | RETURNS THE REQUESTED INFORMATION |
| NO-OP | RETURNS A NO-OP PACKET |
| PAUSE | RETURNS A CONFIRMATION OF THE PAUSE |
| RESUME | RETURNS A CONFIRMATION OF THE RESUME |
| SNAP | RETURNS A CONFIRMATION OF THE SNAP OPERATION |
| READ OPAQUE | RETURNS THE REQUESTED DATA |
| WRITE OPAQUE | RETURNS A CONFIRMATION OF THE WRITE OPERATION |
| AUTH | RETURNS A RESPONSE TO THE AUTHENTICATION REQUEST |
| MSG | RETURNS A CONFIRMATION OF RECEIPT OF THE MESSAGE |

FIG. 11

MULTI-PROTOCOL SHARABLE VIRTUAL STORAGE OBJECTS

BACKGROUND OF THE INVENTION

1. Field of the Invention

The present invention relates generally to data processing networks including multiple clients and servers such as data storage systems and network file servers. The present invention specifically relates to the sharing of data storage objects between clients and servers using different interfaces, protocols, or operating systems.

2. Description of the Related Art

Network data storage is most economically provided by an array of low-cost disk drives integrated with a large semiconductor cache memory. A number of data mover computers are used to interface the cached disk array to the network. The data mover computers perform file locking and file metadata management and mapping of the network files to logical block addresses of storage in the cached disk array, and move data between network clients and storage in the cached disk array. Typically the logical block addresses of storage are subdivided into logical volumes. Each logical volume is mapped to the physical storage using a respective striping and redundancy scheme. The data mover computers typically use the Network File System (NFS) protocol to receive file access commands from clients using the UNIX (Trademark) operating system or the LINUX (Trademark) operating system, and the Common Internet File System (CIFS) protocol to receive file access commands from clients using the MicroSoft (MS) WINDOWS (Trademark) operating system.

More recently there has been a dramatic increase in various ways of networking clients to storage and protocols for client access to storage. These networking options include a Storage Area Network (SAN) providing a dedicated network for clients to access storage devices directly via Fibre-Channel, and Network Attached Storage (NAS) for clients to access storage over a Transmission Control Protocol (TCP) and Internet Protocol (IP) based network. In addition to the high-level file-access protocols such as NFS and CIFS, the various networking options may use lower-level protocols such as the Small Computer System Interface (SCSI), the Fibre-Channel protocol, and SCSI over IP. However, most network facilities for data sharing and protection are based on file access protocols, and therefore the use of lower-level protocols in lieu of file access protocols for access to network storage may limit the available options for data sharing and protection.

SUMMARY OF THE INVENTION

In accordance with one aspect, the invention provides a method of access to a storage object in a file server. The file server and a client are included in a data processing network. The method includes the client using a block level access protocol over the network to access the storage object; and the file server accessing the storage object by accessing a file containing data of the storage object.

In accordance with another aspect, the invention provides a method of access to a virtual direct access storage device in the file server. The file server and a client are included in a data processing network. Attributes and data of the virtual direct access storage device are stored in at least one file in the file server. The method includes the client using a block level access protocol over the network to access the virtual direct access storage device in the file server. The file server responds to commands in accordance with the block level access protocol for access to the virtual direct access storage device by accessing the attributes and data of the virtual direct access storage device. The method further includes the file server providing access over the network to the virtual block storage device in accordance with a file access protocol by accessing the at least one file in the file server.

In accordance with yet another aspect, the invention provides a network file server. The network file server includes data storage, an interface for coupling the data storage to a data network; and at least one processor programmed for permitting clients in the data network to access the data storage in accordance with a plurality of access protocols. The data storage contains at least one file for storing file attributes and metadata defining a virtual direct access storage device and for storing data of the virtual direct access storage device. The access protocols include at least one block level access protocol for access to the virtual direct access storage device by accessing the metadata and data of the virtual direct access storage device. The access protocols also include at least one file access protocol for accessing the at least one file.

In accordance with a final aspect, the invention provides a network file server. The network file server includes data storage, an interface for coupling the data storage to an IP data network, and at least one processor programmed for permitting clients in the data network to access the data storage in accordance with a plurality of access protocols. The data storage contains at least one file for storing file attributes and metadata defining a virtual SCSI direct access storage device and for storing data of the virtual direct access storage device. The access protocols include a SCSI block level access protocol for client access to the virtual SCSI direct access storage device over the IP network by accessing the metadata and data of the virtual direct access storage device. The access protocols further include at least one file access protocol for accessing said at least one file. The network file server further includes a facility for remote replication of the at least one file over the IP network concurrent with client write access to the virtual SCSI direct access device over the IP network using the SCSI block level access protocol. The remote replication facility may use a snapshot copy facility for replication by transmitting read-only versions (i.e., snapshots) of the at least one file over the IP network.

BRIEF DESCRIPTION OF THE DRAWINGS

Other objects and advantages of the invention will become apparent upon reading the following detailed description with reference to the accompanying drawings wherein:

FIG. 10 is a table of client opcodes for the NBS protocol of FIG. 9;

FIG. 11 is a table of server opcodes for the NBS protocol of FIG. 9;

Figure 1:
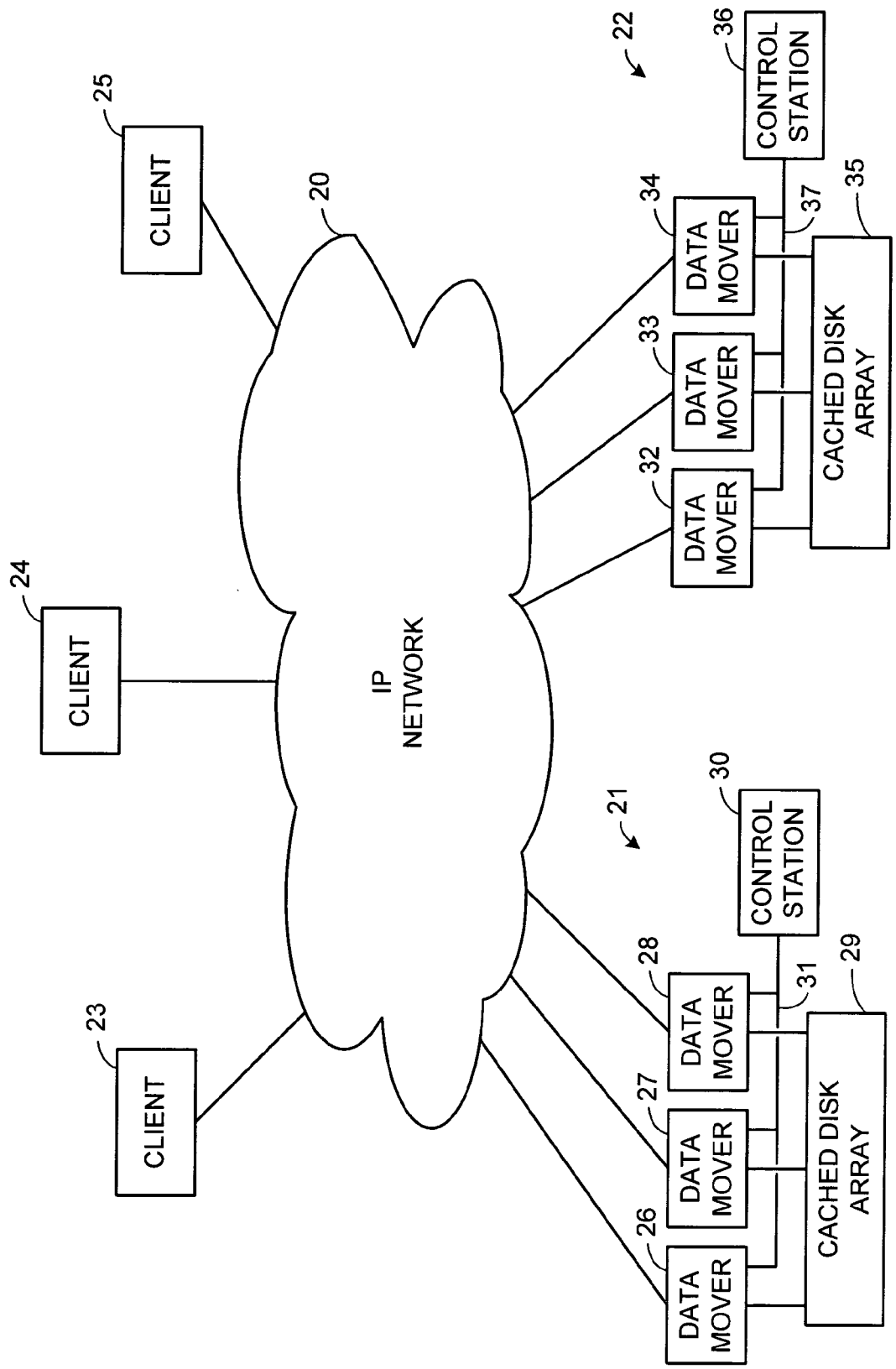
FIG. 1 is a block diagram of a data processing system including multiple clients and network file servers.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

FIG. 1 shows an IP network 20 including multiple network file servers 21, 22, and multiple clients 23, 24, 25. The clients and network file servers, for example, can be distributed world wide and linked via the Internet. Each of the network file servers 21, 22, for example, has multiple data mover computers 26, 27, 28, 32, 33, 34, for moving data between the IP network 20 and the cached disk arrays 29, 35 respectively. Each of the network file servers 21, 22 also has a control station 30, 36 connected via a dedicated dual-redundant data link 31, 37 among the data movers for configuring the data movers and the cached disk array 29, 35. Further details regarding the network file servers 21, 22 are found in Vahalia et al., U.S. Pat. No. 5,893,140, incorporated herein by reference.

Figure 2:
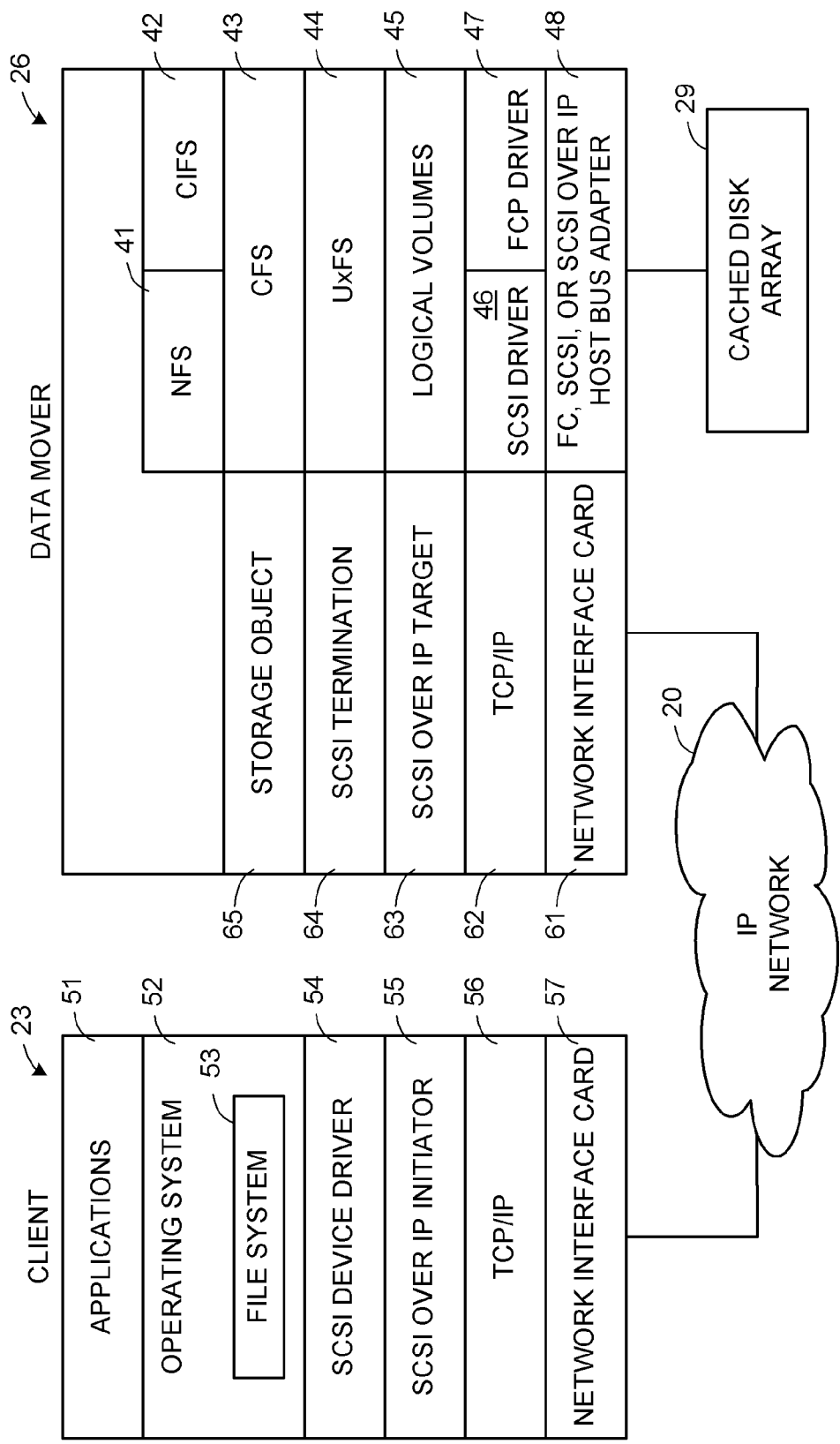
FIG. 2 is a block diagram showing in greater detail one of the clients and one of the network file servers in the data processing system of FIG. 1.

FIG. 2 shows software modules in the client 23 and the data mover 26 introduced in FIG. 1. The data mover 26 has a Network File System (NFS) module 41 for supporting communication among the clients and data movers of FIG. 1 over the IP network 20 using the NFS file access protocol, and a Common Internet File System (CIFS) module 42 for supporting communication over the IP network using the CIFS file access protocol. The NFS module 41 and the CIFS module 42 are layered over a Common File System (CFS) module 43, and the CFS module is layered over a Universal File System (UxFS) module 44. The UxFS module supports a UNIX-based file system, and the CFS module 43 provides higher-level functions common to NFS and CIFS.

The UxFS module accesses data organized into logical volumes defined by a module 45. Each logical volume maps to contiguous logical storage addresses in the cached disk array 29. The module 45 is layered over a SCSI driver 46 and a Fibre-channel protocol (FCP) driver 47. The data mover 26 sends storage access requests through a host bus adapter 48 using the Fibre-Channel protocol, the SCSI protocol, or the iSCSI protocol, depending on the physical link between the data mover 26 and the cached disk array 29.

As introduced above, some clients may desire to use lower-level protocols such as the Small Computer System Interface (SCSI), the Fibre-Channel protocol, and the SCSI over IP protocol in order to access network storage. One environment where this is desirable is a Microsoft Exchange platform. In this environment, a Microsoft Exchange server, or a server for a database such as an Oracle or SQL database, typically stores its database component files and tables such as storage groups, and transaction logs to one or more block devices. It is desired to replace these block devices with remote block devices in a network file server, and to provide disaster protection by replicating the database files and transaction logs to a geographically remote network file server and taking read-only copies or snapshots of the database and logs, for backup to tape.

For the data processing network in FIG. 2, for example, the client may use the SCSI over IP protocol over the IP network 20. In this example, the software modules in the client 23 include application programs 51 layered over an operating system 52. The operating system manages one or more file systems 53. To access the network storage, the file system routines invoke a SCSI device driver 54, which issues SCSI commands to an SCSI over IP initiator 55. The SCSI over IP initiator inserts the SCSI commands into a TCP connection established by a TCP/IP module 56. The TCP/IP module 56 establishes the TCP connection with the data mover 26, and packages the SCSI commands in IP data packets. A network interface card 57 transmits the IP data packets over the IP network 20 to the data mover 26.

A network interface card 61 in the data mover 26 receives the IP data packets from the IP network 20. A TCP/IP module 62 decodes data from the IP data packets for the TCP connection and sends it to an SCSI over IP target software driver module 63. The SCSI over IP target module 63 decodes the SCSI commands from the data, and sends the SCSI commands to a SCSI termination 64. The SCSI termination is a software module that functions much like a controller in a SCSI disk drive, but it interprets a storage object 65 that defines a logical disk drive. The SCSI termination presents one or more virtual LUNs to the SCSI over IP target 63. A virtual LUN is built on top of the storage object 65, and it emulates a physical SCSI device by implementing SCSI primary commands (SPC-3) and SCSI block commands (SBC-2).

Instead of reading or writing data directly to a physical disk drive, the SCSI termination 64 reads or writes to a data storage area of the storage object 65. The storage object, for example, is contained in a file or file system compatible with the UNIX operating system and the MS-Windows operating system. Therefore, file access protocols such as NFS and CIFS may access the storage object container file. Consequently, conventional facilities for data sharing and protection may operate upon the storage object container file. Use of a file as a container for the storage object may also exploit some file system features such as quotas, file system cache in the data mover, and block allocation on demand.

The SCSI over IP protocol begins with a login process during which the SCSI over IP initiator establishes a session with a target. TCP connections may be added and removed from a session. The login process may include authentication of the initiator and the target. The TCP connections are used for sending control messages, and SCSI commands, parameters, and data.

Figure 3:
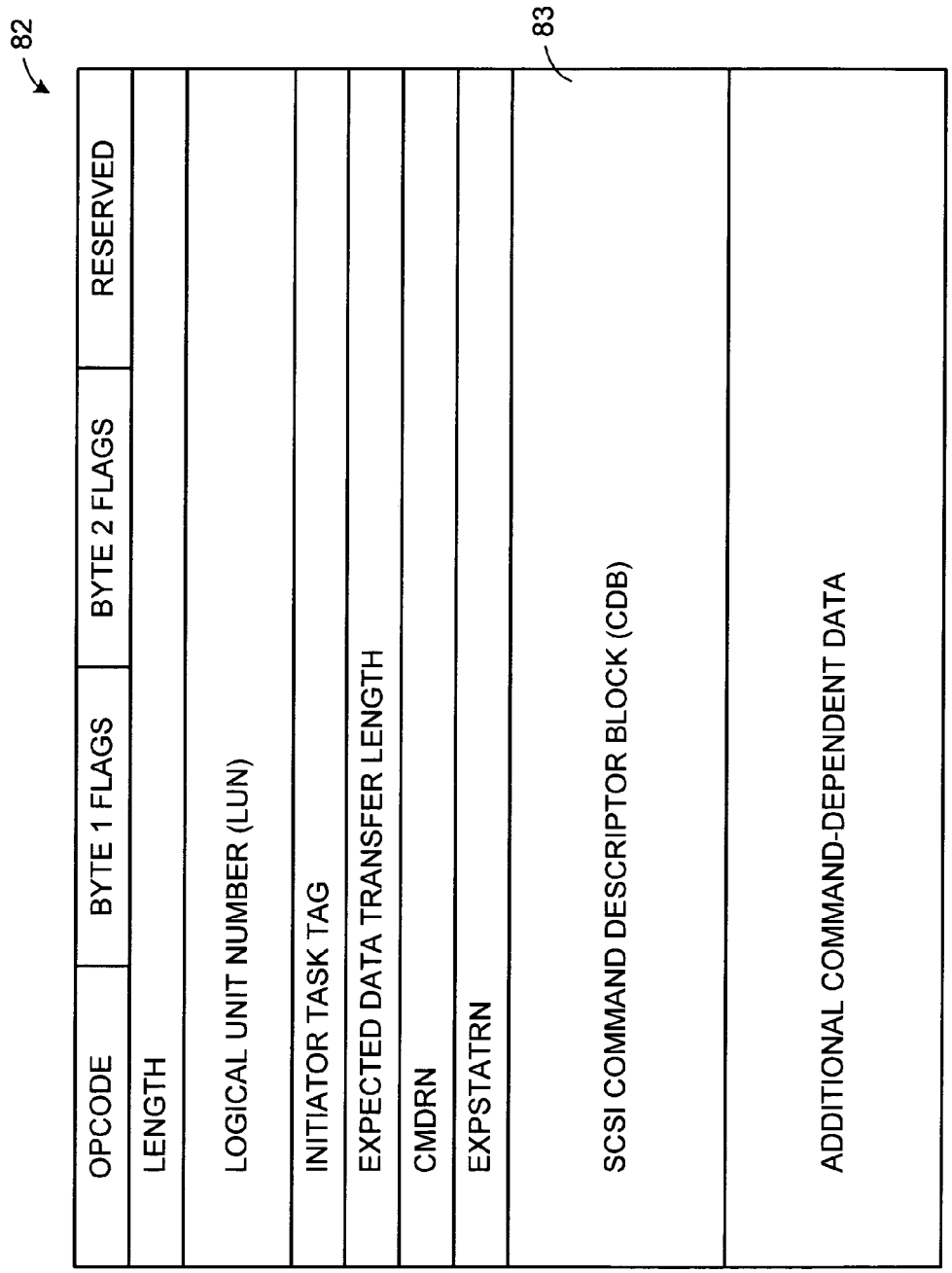
FIG. 3 is a block diagram of a command in accordance with the Small Computer System Interface (SCSI) protocol.

FIG. 3 shows one type of an SCSI over IP protocol PDU command 82. The command 82 includes a one-byte opcode indicating the command type, and two bytes of flags. The first byte of flags includes two flags that indicate how to interpret the following length field, and a flag set to indicate a read command. The second byte of flags includes one Autosense flag and three task attribute flags. The command 82 includes a length indicating the length of the command in bytes, and a Logical Unit Number (LUN) specifying the Logical Unit to which the command is targeted. The command 82 includes an Initiator Task Tag assigned to each SCSI task initiated by the SCSI initiator. A SCSI task is a linked set of SCSI commands. The Initiator Task Tag uniquely identifies each SCSI task initiated by the SCSI initiator. The command 82 includes a Command Reference Number (CMDRN) for sequencing the command, and an Expected Status Reference Number (EXPSTATRN) for indicating that responses up to EXPSTATRN-1 (mod 232) have been received. The command 82 includes an Expected Data Transfer Length that the SCSI initiator expects will be sent for this SCSI operation in SCSI data packets. The command 82 includes a 16-byte field 83 for a Command Descriptor Block (CDB). The command 82** may also include additional command-dependent data.

Figure 4:
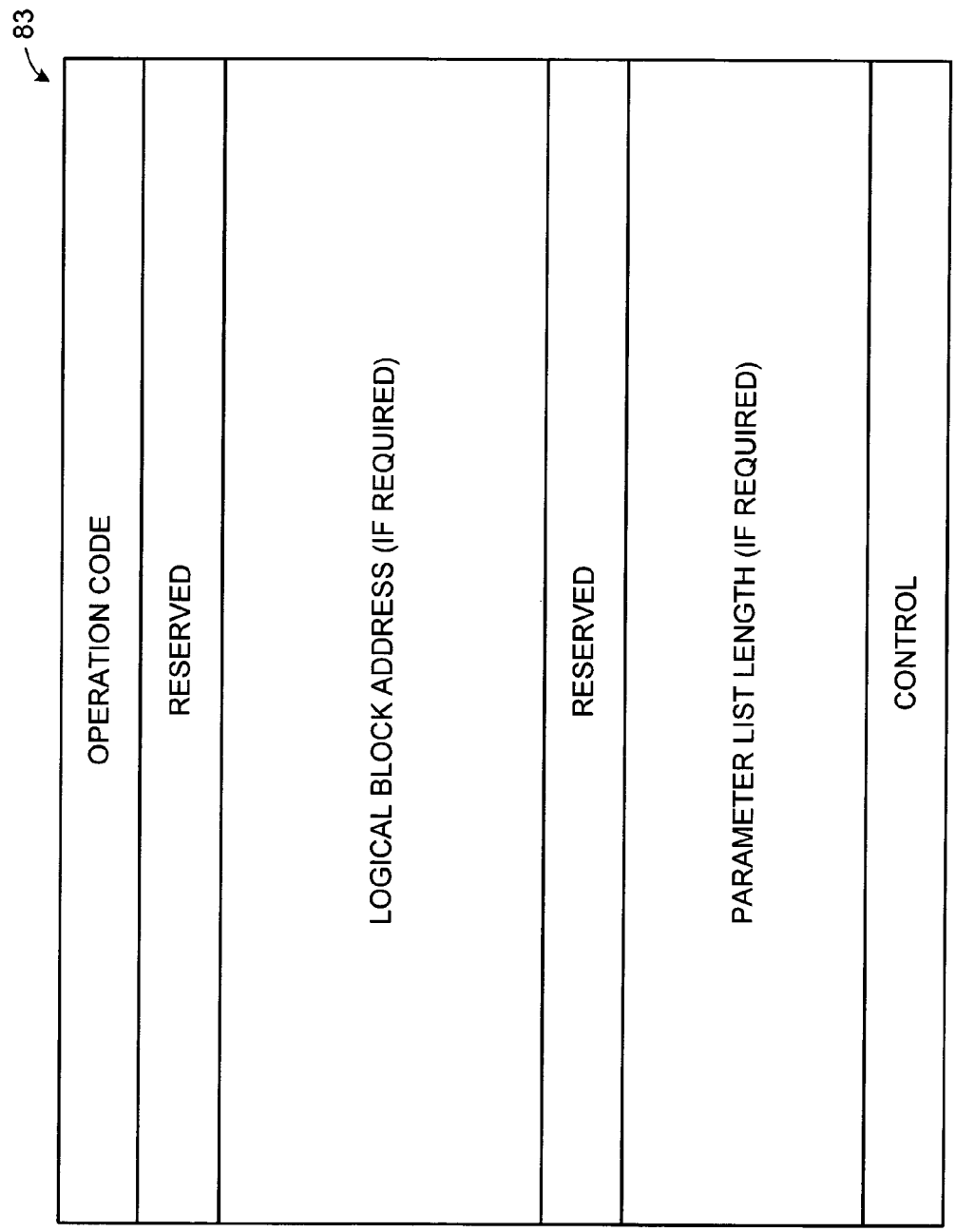
FIG. 4 is a block diagram of a SCSI Command Descriptor Block (CDB) in the SCSI command of FIG. 3.

FIG. 4 shows a typical example of the SCSI Command Descriptor Block (CDB) 83 in the SCSI command of FIG. 3. In this example, the CDB 83 is ten bytes in length. The CDB 83 includes a one-byte operation code, a four-byte logical block address (if required), a two-byte parameter list (if required), and a control byte. SCSI disk drives internally translate the logical block address to a physical cylinder, head, and sector address in order to perform a read or write data access.

Figure 5:
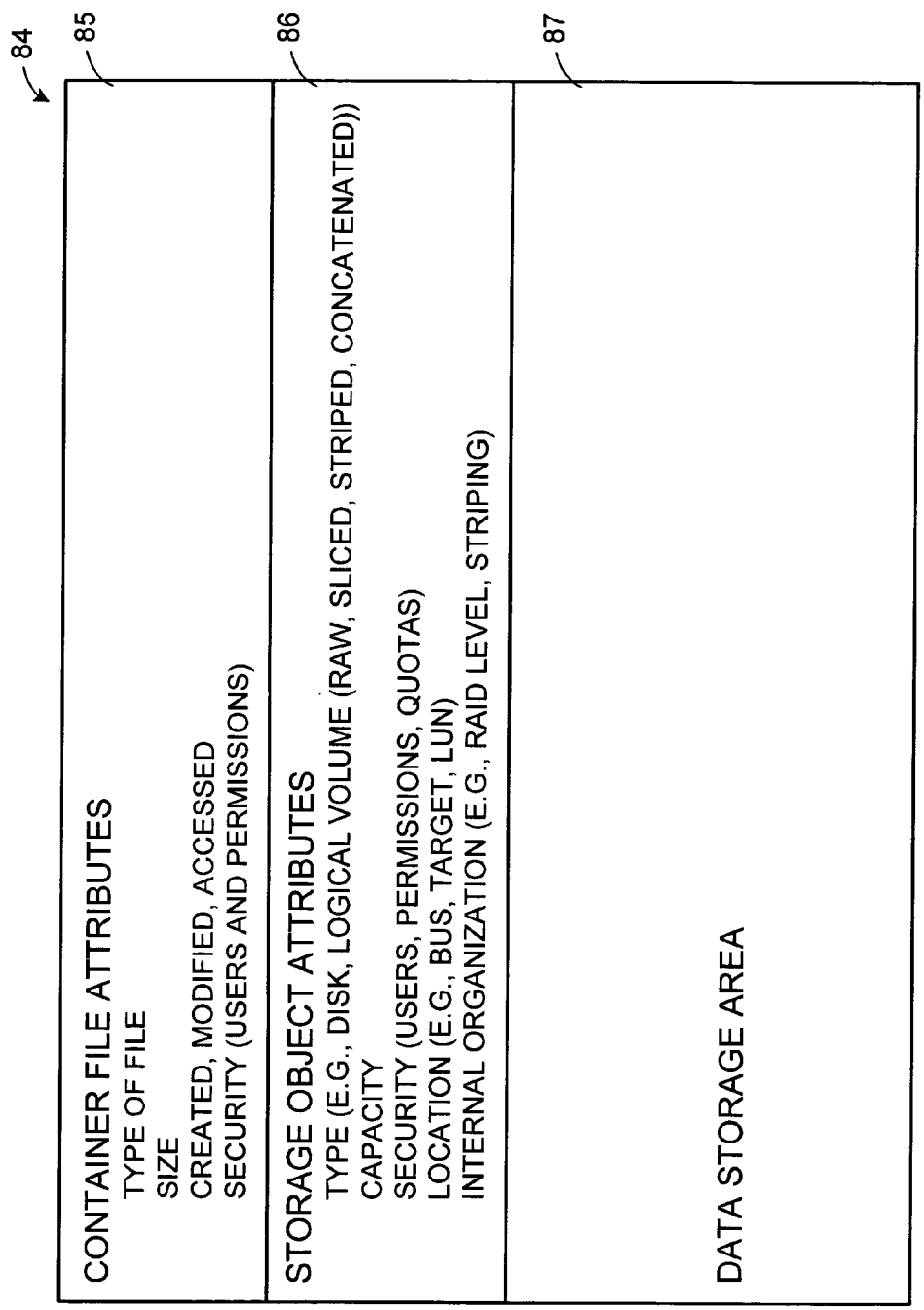
FIG. 5 is a block diagram of a storage object container file.

FIG. 5 shows a container file 84 for a storage object. The container file 84 includes conventional attributes 85 of the container file such as the type of file, the size of the file, the date and time when the file was created, last modified, and last accessed, and security information such as a list of users having access permissions and the access permission of each user.

The conventional data storage area of the container file 84 includes a header 86 of storage object metadata including storage object attributes, and a storage object data storage area 87 for storage of data of the storage object. The storage object attributes 86 include a storage object type such as a disk drive or a logical volume of storage. The logical volume of storage could be a raw volume, a sliced volume, a striped volume, or a concatenated volume. A raw volume corresponds to one disk or one disk partition. A sliced volume is partitioned, for example, into public and private regions. A striped volume is striped across more than one disk. A concatenated volume results from the combination of raw volumes, for example, to provide a volume size greater than the maximum size of a basic raw volume.

The storage object attributes 86 also include a storage capacity in bytes, and the amount of storage presently used, and the amount of free space in the storage object. The storage object attributes 86 include a list of users permitted to access the storage object through the SCSI termination module (64 in FIG. 2), and a respective permission and quota for each user. Moreover, the storage object attributes may include configuration information, such as a location (bus, target and LUN) of the storage object, and an internal organization of the storage object, such as a level of redundancy in an array of disk drives (RAID level) and a striping scheme. The specified internal organization of the storage object could be used as a guide or specification for mapping of the data storage area 87 of the container file 84 to storage in the cached disk array (49 in FIG. 2).

The various RAID levels include: no redundancy (level 0); mirrored disks (level 1); Hamming code for error correction (level 2); single check disk per group (level 3); independent reads and writes (level 4); spread data/parity over all disks (no single check disk) (level 5). These various RAID levels are described in Patterson et al., "A Case for Redundant Arrays of Inexpensive Disks (RAID)," Report No. UCB/CSD 87/391, Computer Science Division (EECS), University of California, Berkeley, Calif., December 1987, pp. 1-24, incorporated herein by reference. Raid levels 2 to 5 imply certain patterns of striping of data and check information across the disk array. The striping pattern may affect access performance in various ways depending on whether the access is read or write, or intermittent or continuous. For example, a striping pattern for continuous media files is shown in FIG. 21 of Venkatesh et al., U.S. Pat. No. 5,974,503 issued Oct. 26, 1999 and entitled "Storage and Access of Continuous Media Files Indexed as Lists of RAID Stripe sets associated with file names," incorporated herein by reference. Striping patterns for mirrored disks are disclosed in Venkatesh et al., U.S. Pat. No. 6,397,292 issued May 28, 2002, and entitled "Asymmetrical Striping of Mirrored Storage Device Arrays and Concurrent Access to Even Tracks in the First Array and Odd Tracks in the Second Array To Improve Data Access Performance," incorporated herein by reference.

Figure 6:
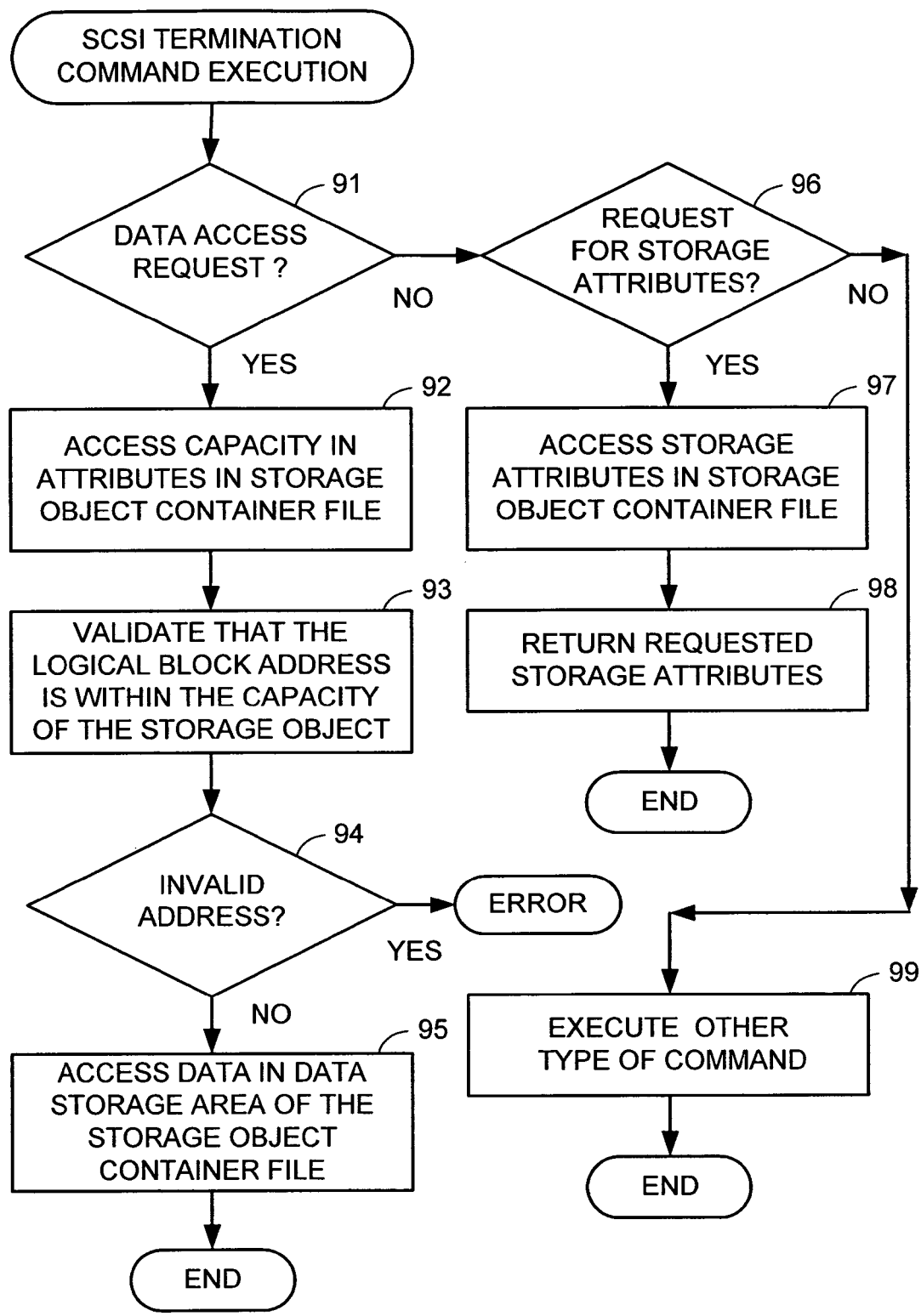
FIG. 6 is a flow chart of command execution by a SCSI termination module in the data mover of FIG. 2.

FIG. 6 shows a procedure for execution of a SCSI command by the SCSI termination module in the data mover of FIG. 2. In a first step 91, execution continues to step 92 if the SCSI command is a request for data access. In step 92, the capacity of the storage object is obtained from the storage object attributes in the storage object container file. In step 93, the logical block address specified in the SCSI command is compared to the capacity in order to validate the address if the logical block address is less than the capacity. If the logical block address is invalid, then execution branches from step 94 to handle the error. Otherwise, execution continues to step 95. In step 95, the logical block address is used to access the storage area of the storage object in the container file. In particular, the logical block address from the SCSI command is added to the byte address of the beginning of the storage object data in the storage object container file to provide an address for accessing data in the container file.

In step 91, if the SCSI command is not a data access request, then execution branches to step 96. In step 96, if the SCSI command is a request for storage attributes, then execution continues to step 97. In step 97, the SCSI termination module accesses storage attributes in the storage object container file. In step 98, the requested storage attributes are returned to the SCSI device driver having originated the SCSI command.

If in step 96 the SCSI command is not a request for storage attributes, then execution branches from step 96 to step 99, in order to execute the command.

In the data processing system of FIG. 2, it is desired to provide a snapshot copy facility and an IP replication facility in the data mover 26. A snapshot copy provides a point-in-time copy of the data saved on the storage object for on-line data backup applications and data mining tasks. A snapshot copy facility also saves user disk space by only storing the change in the user data since the last snapshot was taken. IP replication can provide high availability of data by maintaining two or more replicas of data on different network file servers at different sites that are geographically remote from each other.

In the data processing system of FIG. 2, it is desired to permit the client 23 to manage backup and replication of its SCSI storage object in the data mover 26 during concurrent access to the storage object using the SCSI over IP protocol. For example, while the client 23 writes data to the data mover 26, the data mover 26 replicates the data to the second network file server 22 in FIG. 1 by transmitting a copy of the data over the IP network 20 using the NFS or CIFS protocols. One way of doing this is to provide a parallel and concurrent TCP connection between the client 23 and the data mover 26 for control of snapshot copy and IP replication applications in the data mover 26. This method is described below with reference to FIGS. 7 to 14.

Figure 7:
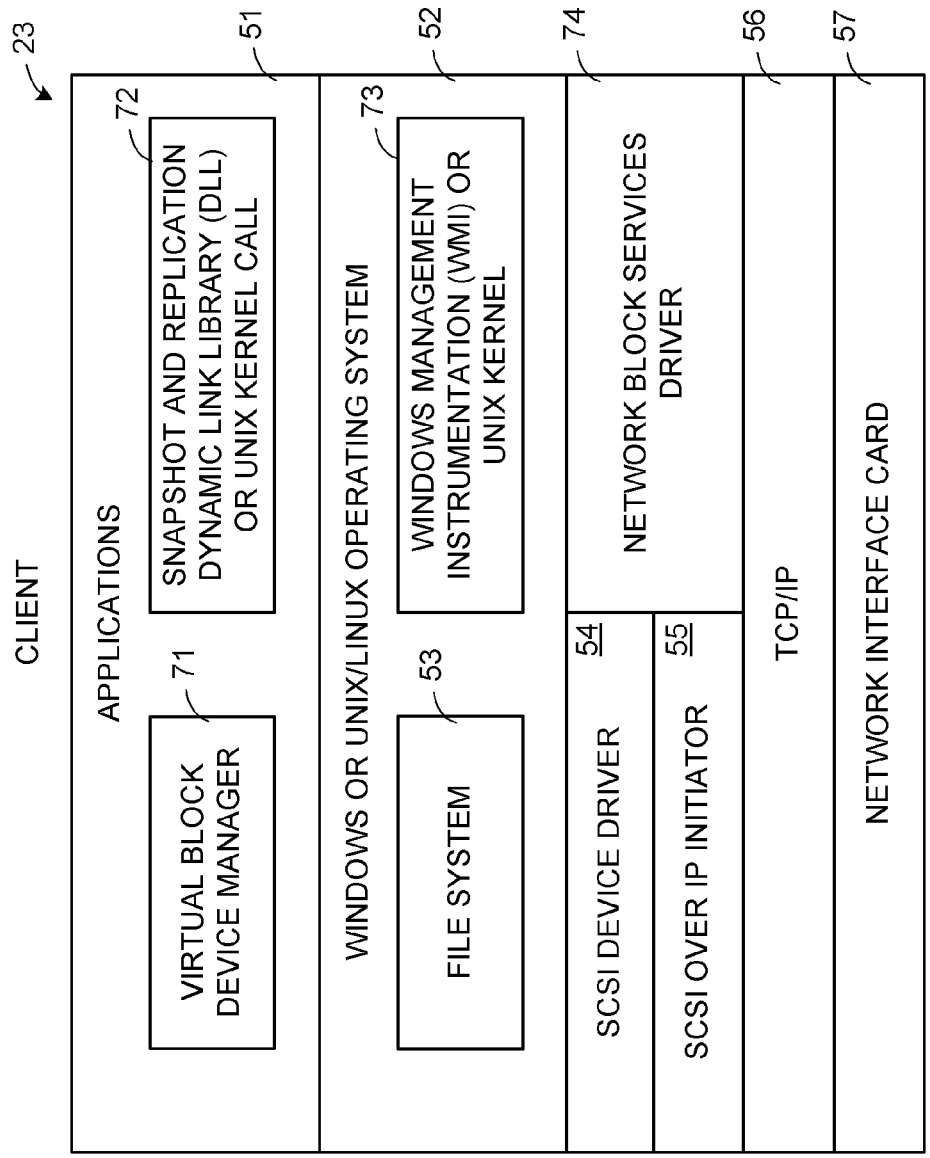
FIG. 7 is a more detailed block diagram of the client in FIG. 2.

As shown in FIG. 7, the client is provided with an application program called a virtual block device manager 71 for managing backup and replication of the client's storage object 65 in the data mover 26. In order to backup or replicate a consistent view of the storage object 65, write access to the storage object by the SCSI device driver is synchronized to the backup or replication process. For example, write access of the storage object 65 is paused at the completion of a synchronous write, a commit operation for a series of asynchronous writes, or a commit of a current transaction consisting of a series of write operations. During the pause, a snapshot copy operation is initiated for the backup or replication process.

One way of pausing write access to the storage object 65 at the completion of a commit operation is to provide a service in the applications 51 or the file system 53 that provides a notification to interested applications of the commit operation and suspends further write operations to storage until an acknowledgement is received from the interested applications. Although the Windows operating system 52 does not presently provide such a service, the Microsoft Exchange application provides such a service.

In a MS Windows machine, the Windows Management Instrumentation (WMI) facility 73 provides a mechanism for communication between processes. The WMI facility 73 functions as a mailbox between processes in the client 23. A process may call a WMI driver routine that places data into the WMI facility and notifies subscribers to the data. In the example of FIG. 7, for example, the virtual block device manager 71 calls a routine in a snapshot and replication dynamic link library (DLL) 72, which receives notification of a commit event. For example, the Microsoft Exchange application responds to an application program interface (API) call that invokes the service in Exchange to suspend further write operations after a commit operation, and returns a notification that further write operations have been suspended. A similar API is used in UNIX file systems. This API call is provided in order to put the database such as Exchange or Oracle in a quiescent state in order to make a backup copy of the database. In the event of a system crash, the database application can replay its logs during recovery to ensure that its backup database is brought back to a consistent state. When a commit event has occurred and further writing over the SCSI over IP TCP connection (112 in FIG. 12) is inhibited, a network block services (NBS) driver 74 in the client establishes a parallel and concurrent TCP connection (113 in FIG. 12) to a network block services server 75 in the data mover (26 in FIG. 12.) NBS control commands cause a snapshot copy facility 76 or an IP replication facility 77 to initiate a snapshot copy or IP replication process upon the storage object 65. The snapshot copy or IP replication process may continue as a background process concurrent with subsequent write access on a priority basis when the SCSI termination 64 executes SCSI write commands from the client's SCSI driver 54.

The IP replication facility may use the snapshot copy facility for the remote replication process by transmission of data from the snapshot copies over the IP network concurrent with client write access to the storage object 65. For example, the snapshot copy facility periodically takes a snapshot of a consistent view of the storage object 65, and the IP replication facility transmits the differences between the successive snapshots over the IP network to a remote network file server.

The NBS protocol is introduced in Xiaoye Jiang et al., "Network Block Services for Client Access of Network-Attached Data Storage in an IP Network," U.S. patent application Ser. No. 10/255,148 filed Sep. 25, 2002, incorporated herein by reference. This protocol is extended for snapshot copy and replication of storage objects, as further described below with reference to FIGS. 9 to 11. Details of a snapshot copy facility are described in Keedem U.S. Pat. No. 6,076,148 issued Jun. 13, 2000, incorporated herein by reference; and Philippe Armangau et al., "Data Storage System Having Meta Bit Maps for Indicating Whether Data Blocks are Invalid in Snapshot Copies," U.S. patent application Ser. No. 10/213,241 filed Aug. 6, 2002, incorporated herein by reference. Details of an IP replication facility are described in Raman, et al., U.S. patent application Ser. No. 10/147,751 filed May 16, 2002, entitled "Replication of Remote Copy Data for Internet Protocol (IP) transmission," incorporated herein by reference; and Philippe Armangau et al., Data Recovery With Internet Protocol Replication With or Without Full Resync, U.S. patent application Ser. No. 10/603,951 filed Jun. 25, 2003, incorporated herein by reference. The snapshot copy or IP replication facility, for example, operates on a file system (88 in FIG. 12) compatible with the UNIX and MS Windows operating systems. In this case, the snapshot copy facility 76 or the IP replication facility 77 accesses the storage object container file 84 through the UxFS file system 44 in the data mover 26.

The snapshot copy facility 76 may use a "write-anywhere" file versioning method. A snapshot of a file initially includes only a copy of the inode of the original file. Therefore the snapshot initially shares all of the data blocks as well as any indirect blocks of the original file. When the original file is modified, new blocks are allocated and linked to the original file inode to save the new data, and the original data blocks are retained and linked to the snapshot inode. The result is that disk space is saved by only saving the delta of two consecutive versions.

The IP replication facility 77 can be based on a snapshot copy facility 76 that periodically saves the deltas between consecutive consistent versions of a file. In a background process, the data mover transmits the deltas over the IP network to another file server at a remote location. Upon confirmation of receipt of a delta at a remote location, the data mover can delete its local copy of the delta.

The network block services driver 74 communicates with the network block services server 75 using a relatively lightweight protocol designed to provide block level remote access of network storage over TCP/IP. This protocol also provides remote control of snapshot copy and IP replication facilities. The network block services server 75 maintains in memory a doubly-linked list of storage objects accessible to clients via their network block services drivers. Each storage object is also linked to a list of any of its snapshot copies. A copy of this list structure is maintained in storage. When the data mover 26 reboots, the NBS server rebuilds the in-memory list structure from the on-disk structure. The data mover 26 also maintains a directory of the storage objects using as keys the file names of the storage object container files. The in-memory list structure and the directory are extended to include the SCSI over IP storage objects, so that each SCSI over IP storage object is accessible to a client through the SCSI termination 64 or the network block services server 75. In particular, each virtual LUN recognized by the SCSI termination 64 has a corresponding NBS identifier recognized by the network block services server 75 and a corresponding storage object container file name. API calls are provided to coordinate the SCSI over IP initiator 66 and the SCSI termination 64 with the NBS protocol during snapshot operations. For example, the snapshot and replication DLL 72 includes an API call through the WMI 73 to the SCSI over IP initiator 66 for changing the destination address of the SCSI over IP protocol. This API call can be used during a restore operation, in order to resume processing from a backup copy of the storage object 65 after a disruption. The storage object 65 could be included in a storage object container file or could be a raw volume of the storage array or any combination of volumes such as raw volumes, slices, striped volumes or meta concatenated volumes. This approach has minimal impact on upper layer components of the operating system of the client 23.

Figure 9:
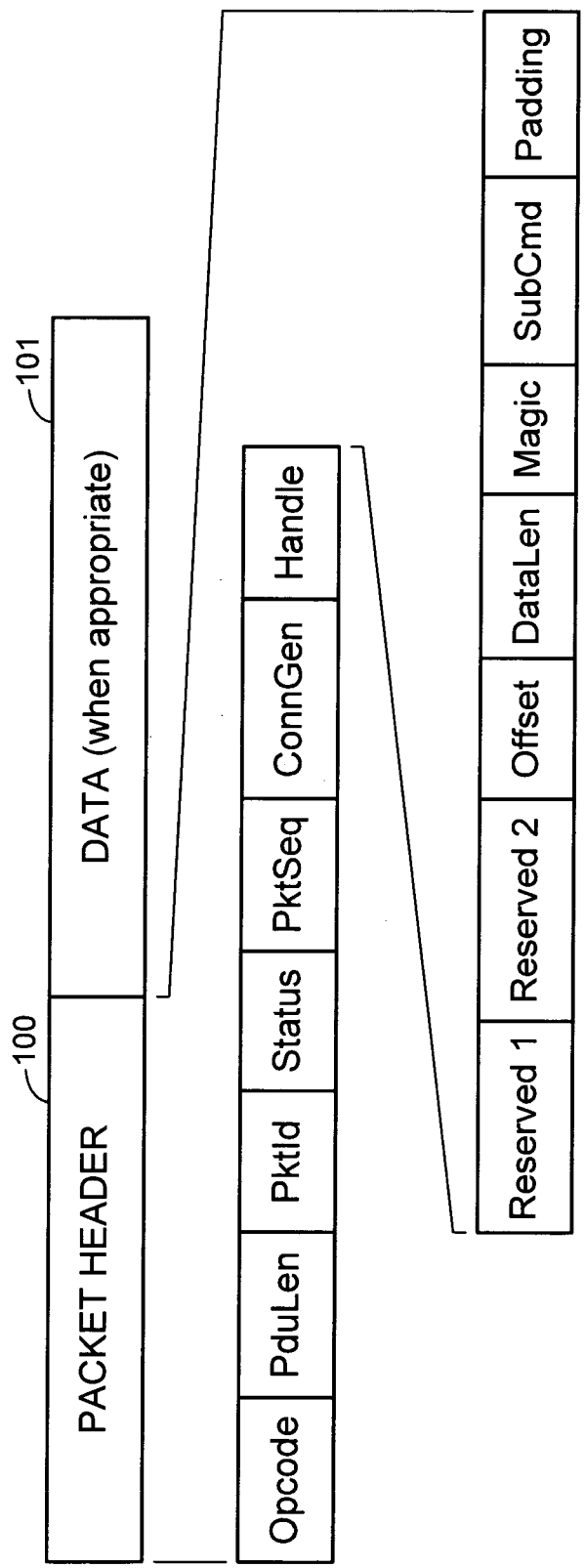
FIG. 9 is a block diagram of a data packet for a Network Block Services (NBS) protocol.

FIG. 9 shows an IP data packet encoded by the network block services driver (74 in FIG. 7). The data packet includes a packet header 100 and, when appropriate, data 101 appended to the packet header. The packet header, for example, has the following format:

```
struct PktHdr{
    unsigned long    OpCode;
    unsigned long    PduLen;
    unsigned long    PktId;
    RtnStat_t        Status;
    unsigned long    PktSeq;
    unsigned long    ConnGen
    unsigned         Handle[MAX_NBS_HANDLE_LEN];
    unsigned long    Reserved1
    unsigned long    Reserved2;
    unsigned long    DataLen
    integer          Magic[MAGIC_LEN];
    unsigned long    SubCmd;
    unsigned long    Offset;
    unsigned long    Padding[13];
    unsigned long    CRC
};
```

These fields include an opcode field (OpCode), a packet data unit length field (PduLen), a packet identifier field (PktId), a reply status field (Status), a packet sequence field (PktSeq), a connection generation count field (ConnGen), an object handle field (Handle), two reserved fields (Reserve1 and Reserve2), an offset field (Offset) for specifying a start block offset, a data length field (DataLen), a magic field containing "NBS" and a revision number, a sub command field (Sub-Cmd), a padding field (Padding), and a CRC field containing a cyclic redundancy check of the header excluding the CRC field. The OpCode, PduLen, Status, Offset and DataLen fields in the packet header are all represented as network byte order (i.e. big endian). All bits not defined should be set to zero, and all reserved and padding fields should be set to zero as well.

Figure 8:
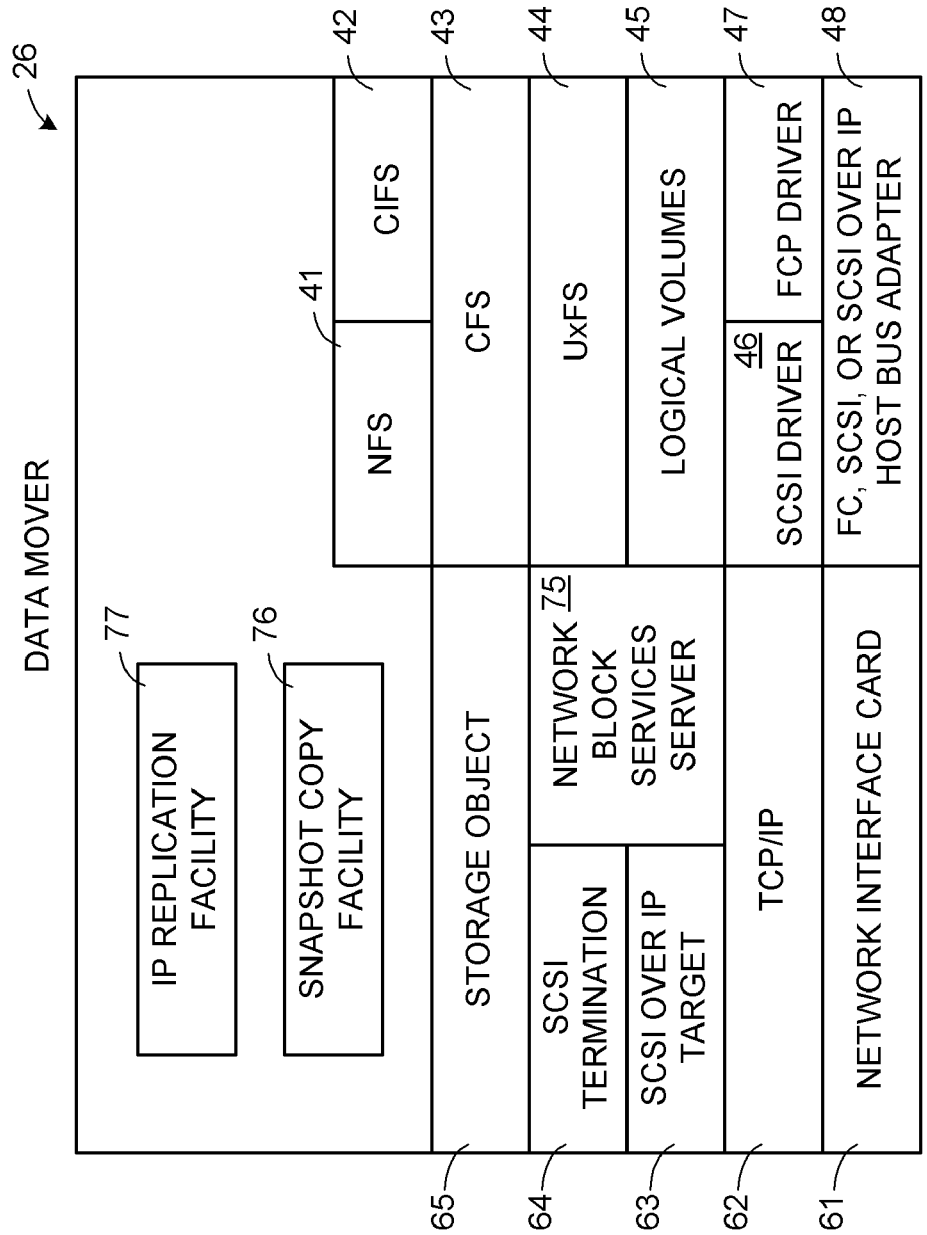
FIG. 8 is a more detailed block diagram of the data mover in FIG. 2.

FIG. 10 shows a table of some client opcodes in IP packets produced by the network block services driver (74 in FIG. 7) and transmitted from the client (23 in FIG. 7) to the network block services server (75 in FIG. 8). The client opcodes have the following format:

```
0x0000    READ
0x0001    WRITE
0x0003    INFO
0x0004    NO-OP
0x0005    PAUSE
0x0006    RESUME
0x0007    SNAP
0x0008    READ_OPAQUE
0x0009    WRITE_OPAQUE
0x000a    AUTH
0x000b    MSG
```

A READ opcode is used when network block services driver requests the network block services server to read a specified length of data from a specified storage object beginning at a specified offset. A WRITE opcode is used when the network block services driver requests the network block server to write a specified length of data to a specified storage object beginning at a specified offset.

An INFO opcode is used when the network block services driver discovers storage objects in the network block services server. It has two sub commands: NBS_INFO_CMD_LIST and NBS_INFO_CMD_INFO.

NBS_INFO_CMD_LIST sub command is used to retrieve an NBS storage object list on the server. NBS_INFO_CMD_INFO sub command is used to get the capacity and handle information of a NBS storage object with a specific external name. The parameters and results are encapsulated in XML format and attached to the packet header.

For the LIST request, the client supplies authentication information, and the server returns the list of storage object information to the client, including the external name of the storage objects and their attributes. The attached XML format is defined as:

```
Request:
    <nbsLstRqst/>
Reply:
    <nbsLstRply>
    <nbs name=\"%s\" blkSize=%lu numBlks=%Lu rw=%d share=%d
        snapable=%d dr=%d tws=%d />"
    ...
    </nbsLstRply>
```

For the INFO request, the client will provide the external name of the storage object, the server will reply with the size of blocks and the total number of blocks for that storage object.

```
Request:
    <nbsInfoRqst nbsId=\"%s\" />
Reply:
    <nbsInfoRply BlkSize=%lu NumBlks=%Lu rw=%d share=%d
        xferSize=%u snapable=%d dr=%d tws=%d />"
```

A "NO-OP" opcode is used when the network block services driver sends a packet to the network block services server to get a return packet to test or keep alive a TCP connection between the network block services driver and the network block services server.

The PAUSE and RESUME commands are used to pause and resume access to a specified storage object in order to ensure data consistency. For example, this is done during system maintenance and snapshot operations.

The SNAP opcode is used for snapshot management. A sub command is included for a specific snapshot operation such as create a snapshot of a storage object, delete a snapshot, restore a storage object with a snapshot, refresh a snapshot, and list the snapshots for a storage object.

The READ OPAQUE and WRITE OPAQUE permit a read or write of an opaque data structure in a storage object.

The NBS driver uses the AUTH opcode to request a connection and provide authentication to the NBS server. Upon receipt of a connection request, the NBS server first checks an export list to decide whether to accept the connection. Once the connection established, a one-way Challenge-Handshake Authentication Protocol (CHAP) is performed to authenticate the NBS driver before accepting further NBS commands from the NBS driver. The CHAP protocol includes the following steps:

1. The client sends a list of available authentication methods to the server. The XML format is:

```
<nbsAuthMethodRqst>
<nbsAuthMethod name=\"%s\" />
...
</nbsAuthMethodRqst>
```

2. The server sends back the authentication method reply with the method the server chooses. The XML format is:
    <nbsAuthMethodRply name=\"%s\"/>
3. The client sends out algorithm code (CHAP_A) that it uses. The XML format is:
    <nbsAuthARqst CHAP_A=%d/>
4. The server sends back a reply with identifier (CHAP_I) and the challenge (CHAP_C). The XML format is:
    <nbsAuthARply CHAP_A=%d CHAP_I=%x CHAP_C=\"%s\"/>
5. The client sends the response (CHAP_R) back to the server. The CHAP_R is calculated based on the secret mapped to the name (CHAP_N), CHAP_I, and CHAP_C. The XML format is:
    <nbsAuthRRqst CHAP_N=\"%s\" CHAP_R=\"%s\"/>
6. If the CHAP_R calculated by the server is the same as the sent by the client, the server sends back the reply indicating a successful authentication. The XML format is:

If at any step the NBS driver fails to send out the correct request and data, then the server would drop the connection. In this case, the NBS driver would need to restart the connection and authentication process.

The MSG opcode is used to send a message from the NBS driver to the NBS server. For example, messages could be sent to control an IP replication process. For example, IP replication parameters would include a network name or IP network address of a target file server to which the container file (84 in FIG. 12) or container file system (88 in FIG. 12) would be replicated.

FIG. 11 shows the server opcodes used in IP data packets returned by the network block services server to the network block services driver. A READ RETURN opcode is used when the network block services server returns the data requested in a driver's read request. The WRITE RETURN opcode is used when the network block services server returns a confirmation of a write operation performed in response to a write request from the network block services driver. The INFO RETURN opcode is used when the network block services server returns information requested by the network disk client. The NO-OP RETURN opcode is used when the network block services server returns a NO-OP packet in response to a NO-OP packet from the network block services client. In a similar fashion, the other return opcodes are used when the server returns requested information or confirmation of receipt or execution of a corresponding command from the NBS driver.

The server opcodes have the following format:

| | |
|---|---|
| 0x0040 | READ RESPONSE |
| 0x0041 | WRITE RESPONSE |
| 0x0043 | INFO RESPONSE |
| 0x0044 | NO-OP RESPONSE |
| 0x0005 | PAUSE RESPONSE |
| 0x0006 | RESUME RESPONSE |
| 0x0007 | SNAP RESPONSE |
| 0x0008 | READ_OPAQUE RESPONSE |
| 0x0009 | WRITE_OPAQUE RESPONSE |
| 0x000a | AUTH RESPONSE |
| 0x000b | MSG RESPONSE |

In the packet header (100 in FIG. 9), the "PduLen" field indicates the total length of packet header 100 and data 101. In INFO and NO-OP operations, the "PduLen" field is set to the length of the Packet Header. In a WRITE request operation or a READ reply, the "PduLen" field is set to the length of the Packet Header and Data Segments. In READ request operation or WRITE reply, the "PduLen" field is represented as the length of Packet Header.

In the packet header (100 in FIG. 9), the "PktId" field is a unique identifier of the packet. The "PktId" field is set by the driver, and need not be changed by the server.

In the packet header (100 in FIG. 9), the "Status" field is zeroed out by the driver, and the server sets up and returns status depending on the success of the requested operation. For example, the server returns an indication of whether or not the requested operation succeeds or fails. For a failed operation, a specific error code may be returned, for example, indicating that a specification is invalid, no memory is available, an object to be accessed is busy or frozen, or a CRC error has occurred. For receipt of a corrupted data packet, a timeout for a response to a request, or for many other failures, retransmission of a request from the driver may be appropriate. If a failure persists after retransmission, then the driver will attempt to connect to the next data mover in the network file server of the NBS server. The NBS driver maintains an outstanding request queue in order to reissue the outstanding requests during this recovery process.

In the packet header (100 in FIG. 9), the "PktSeq" field contains a sequence number of the request packets. Due to network failure or server fail-over, the NBS packets may be lost during transmission between the driver and the server. Sometimes, the packets should be resent. However, some of the NBS requests such as SNAP requests are non-idempotent, and resending those requests can cause incorrect configuration of the storage object if the server responds to duplicate requests. The PktSeq number is used to ensure that the server does not respond to duplicate requests.

In the packet header (100 in FIG. 9), the "ConnGen" field contains a generation count of the client side connection for a particular storage object. The ConnGen field is used by a Linux NBS client to keep track of resend and fail over activities, and to invalidate orphan packets.

In the packet header (100 in FIG. 9), the "Handle" field contains an object handle. The object handle is a sixteen bytes array that contains a connection handle used to identify the storage objects and connection instance for each request.

In the packet header (100 in FIG. 9), the "Reserve1" and "Reserve2" fields are reserved for future use.

In the packet header (100 in FIG. 9), the "Offset" field is the offset of the volume, and it is a count of a number of blocks in the logical volume. For example, each block consists of 8 K bytes. The Offset is only meaningful for READ and WRITE operations.

In the packet header (100 in FIG. 9), for a read request, the "DataLen" field specifies the number of bytes in a Data segment 81 following the packet header 80. For a read request, the "DataLen" field specifies the number of bytes to be read from the specified volume, starting at the Offset into the volume.

In the packet header (100 in FIG. 9), the "Magic" field identifies the version of the NBS driver, in order to permit downward compatibility in case of future enhancements.

In the packet header (100 in FIG. 9), the "SubCmd" field contains the sub-command for the INFO and SNAP commands.

Figure 12:
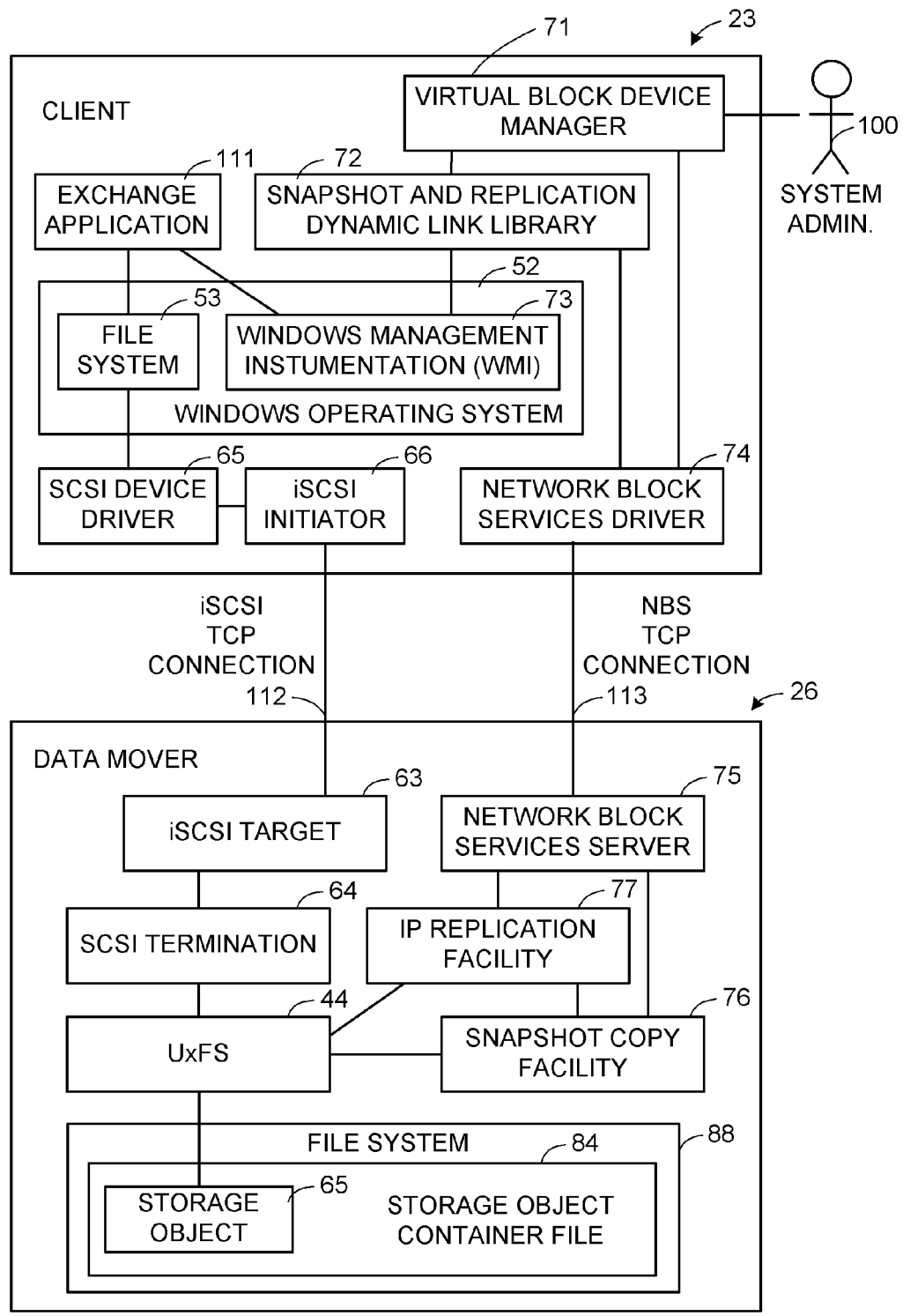
FIG. 12 is a block diagram showing control flow through the client and server of FIGS. 7 and 8 for processing storage object container file snapshot and replication requests from a system administrator.

FIG. 12 shows the control flow through the client and server of FIGS. 7 and 8 for processing snapshot and replication requests from a system administrator 100. This control flow results from operation of the virtual block device manager 71 in FIG. 12 in accordance with the flowchart in FIGS. 13 and 14.

Figure 13:
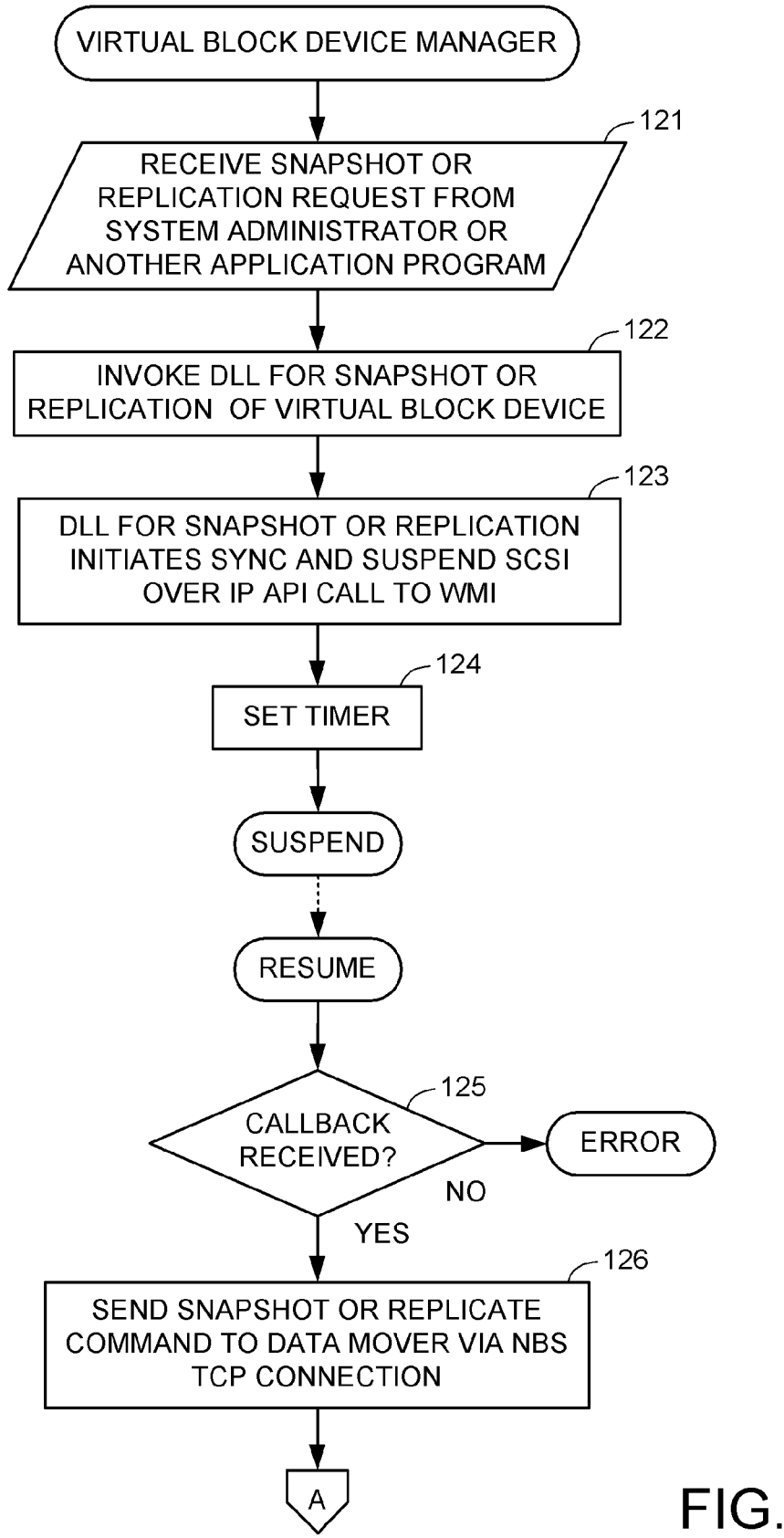
FIGS. 13 and 14 comprise a flow chart of operation of the virtual block device manager in FIG. 12 for processing a snapshot or replication request from the system administrator.

In a first step 121 of FIG. 13, the virtual block device manager receives a snapshot or replication request from the system administrator or another application program of the client. In step 122, the virtual block device manager invokes the DLL routine for a snapshot or replication of the virtual block device. In step 123, the call of the routine in the Windows operating system, or a kernel call in the UNIX operating system, for a snapshot or replication of the virtual block device initiates a sync and suspend SCSI over IP application interface (API) call to WMI 73. This call is relayed to the Exchange application (111 in FIG. 12). Similar calls would be relayed to other applications using virtual block devices to be snapshotted or replicated. Then in step 124 the virtual block device manager sets a timer and then suspends its execution, until execution is resumed by receiving a callback notification that Exchange or other applications have completed a sync and suspend operation, or by expiration of the timer. In step 125, if execution has been resumed but no callback was received, then an error is logged indicating that the Exchange application has failed to perform the sync and suspend SCSI over IP operation within the timer interval. Otherwise, if a callback has been received, then execution continues to step 126. In step 126, the virtual block device manager sends a snapshot or replicate command to the data mover via the NBS TCP connection. After step 126, execution continues in step 127 of FIG. 14.

Figure 14:
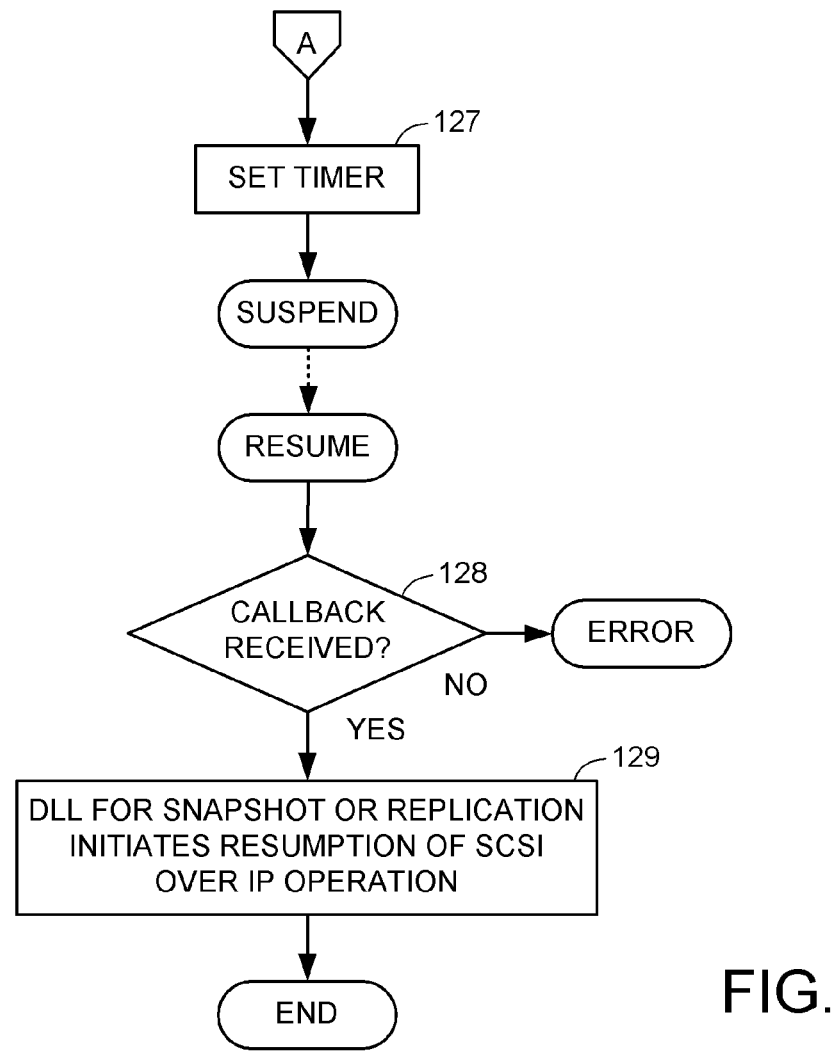

In step 127 of FIG. 14, the virtual block device manager sets a timer and suspends execution. Execution is resumed upon a callback from the network block services driver reporting that a snapshot or replication has been initiated, or upon expiration of the timer interval. In step 128, if execution has been resumed but no callback was received, then an error is logged indicating that the data mover has failed to initiate a snapshot or replication within the timer interval. If a callback was received, then execution continues to step 129. In step 129, the DLL for snapshot or replication initiates resumption of the SCSI over IP operation by the Exchange or other applications.

Figure 15:
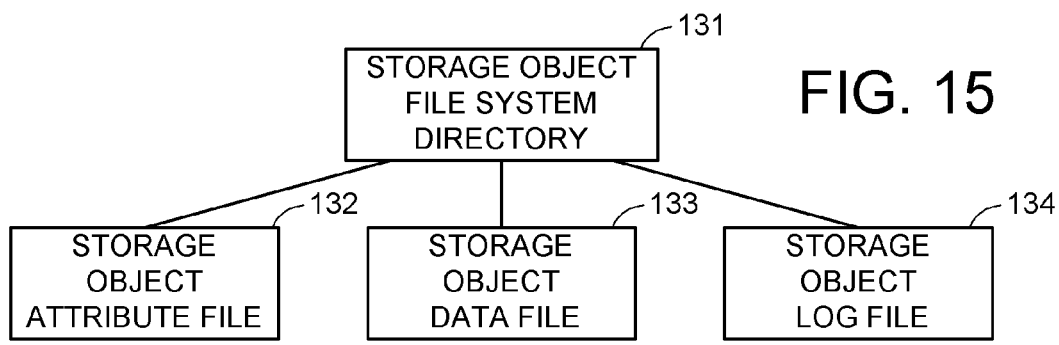
FIG. 15 shows a file system for containing a data storage object.

Although a storage object such as a virtual disk drive or volume could be contained in a single file as shown in FIG. 5, it is also possible to contain the storage object in a file system. As shown in FIG. 15, such a file system includes a storage object file system directory providing directory entries for a storage object attribute file 132, a storage object data file 133, and a storage object log file 134. The data area of the storage object data file 133, for example, would contain the storage object attributes, and the data area of the storage object data file 133 would contain the data of the storage object. The file system may also include a storage object log file 134, which could be used by a client owning the storage object for any purpose, such as a log of the history of access to the storage object. The use of such a file system instead of a single file to contain a storage object would be advantageous in a file server that does not provide range locking within a file. In this case, file-locking contention would be reduced between the storage object attribute file and the storage object data file. Also, the storage object data file 133 would have the advantage that logical block address in the SCSI command block could directly address the storage object data file for read and write operations.

Although the use of the SCSI and NBS protocols have been described above with respect to clients and file servers in an IP network, it should be understood that the SCSI and NBS protocols could used in other kinds of networks, such as Ethernet, Asynchronous Transfer Mode (ATM), or Fibre-Channel (FC) networks. For example, the SCSI or NBS commands could be encapsulated in the data packets of the Ethernet, ATM, or FC networks. It would also be possible to use the FC protocol over a FC network for block level access of a client to a storage object in the server in lieu of a SCSI protocol.

In view of the above, there has been described a method of containing a storage object such as a virtual disk drive or storage volume in a file in order to provide access to the storage object by a low-level protocol such as SCSI, SCSI over IP, or FC concurrent with access to the container file by a high-level protocol such as NFS or CIFS. This permits block level access via different types of network connections such as SAN and NAS concurrent with file system sharing by clients with diverse operating systems, and fast file system backup, fail-over, and recovery.

What is claimed is:

1. In a data processing network including a client, a first file server, and a second file server, a method of access to a storage object in the first file server, said method comprising:
   the client using a block level access protocol over the network to access the storage object in the first file server; and
   the first file server accessing the storage object in the first file server by accessing a file in the first file server containing data of the storage object;
   which includes the first file server replicating a snapshot copy of the file from the first file server over the network to the second file server concurrent with the client using the block level access protocol over the network to write data to the storage object in the first file server;
   wherein the network is an IP network, the client uses the block level access protocol over a first TCP/IP connection over the network to access the storage object in the first file server, and the client initiates the step of the first file server replicating the snapshot copy of the file over the network to the second file server by sending a command over a second TCP/IP connection to the first file server; and
   which includes the client pausing the step of writing of data to the storage object in the first file server after a commit operation, and during the pause, the client performing the step of initiating the step of the first file server replicating the snapshot copy of the file from the first file server over the network to the second file server by sending the command over the second TCP/IP connection.

2. The method as claimed in claim 1, wherein the first TCP/IP connection is concurrent with the second TCP/IP connection.

3. The method as claimed in claim 1, which includes the first file server also providing access to the storage object in the first file server over the network by means of a file access protocol over the network, the file access protocol accessing the file in the first file server containing the data of the storage object in the first file server.

4. The method as claimed in claim 3, wherein the file access protocol is the Network File System (NFS) protocol.

5. The method as claimed in claim 3, wherein the file access protocol is the Common Internet File System (CIFS) protocol.

6. In a data processing network including a client, a first file server, and a second file server, a method of access to a virtual direct access storage device in the first file server, attributes and data of the virtual direct access storage device being stored in at least one file in the first file server, said method comprising:

the client using a block level access protocol over the network to access the virtual direct access storage device in the first file server, the first file server responding to commands in accordance with the block level access protocol for access to the virtual direct access storage device in the first file server by accessing the attributes and data of the virtual direct access storage device in the first file server; and the first file server providing access over the network to the virtual block storage device in the first file server in accordance with a file access protocol by accessing said at least one file in the first file server;

which includes the first file server replicating a snapshot copy of said at least one file from the first file server over the network to the second file server concurrent with the client using the block level access protocol over the network to write new data to the virtual direct access storage device in the first file server;

wherein the network is an IP network, the client uses the block level access protocol over a first TCP/IP connection over the network to the first file server to access the virtual direct access storage device in the first file server, and the client initiates the step of the first file server replicating the snapshot copy of said at least one file by sending a command over a second TCP/IP connection to the first file server; and which includes the client pausing the writing of the new data to the virtual direct access storage device in the first file server after a commit operation, and during the pause, the client performs the step of initiating the step of the first file server replicating snapshot copy of said at least one file by sending the command over the second TCP/IP connection to the first file server.

7. The method as claimed in claim 6, wherein the first TCP/IP connection is concurrent with the second TCP/IP connection.

8. The method as claimed in claim 6, wherein the network is an IP network, and the block level access protocol is the Small Computer System Interface (SCSI) protocol.

9. The method as claimed in claim 6, wherein the file access protocol is the Network File System (NFS) protocol.

10. The method as claimed in claim 6, wherein the file access protocol is the Common Internet File System (CIFS) protocol.

\* \* \* \* \*

UNITED STATES PATENT AND TRADEMARK OFFICE
CERTIFICATE OF CORRECTION

| | | |
|---|---|---|
| PATENT NO. | : 7,953,819 B2 | Page 1 of 1 |
| APPLICATION NO. | : 10/646851 | |
| DATED | : May 31, 2011 | |
| INVENTOR(S) | : Rui Liang et al. | |

It is certified that error appears in the above-identified patent and that said Letters Patent is hereby corrected as shown below:

In Claim 6, Col. 16, line 13, "replicating snapshot" is changed to --replicating the snapshot--.

Signed and Sealed this

Second Day of August, 2011

David J. Kappos
*Director of the United States Patent and Trademark Office*